United States Patent [19]

Lewis, Jr.

[11] 4,402,005

[45] Aug. 30, 1983

[54] CLOCK GENERATOR FOR A DIGITAL COLOR TELEVISION SIGNAL RECEIVER

[75] Inventor: Henry G. Lewis, Jr., Hamilton Square, N.J.

[73] Assignee: RCA Corporation, New York, N.Y.

[21] Appl. No.: 298,270

[22] Filed: Aug. 31, 1981

[51] Int. Cl.³ .............................................. H04N 9/535
[52] U.S. Cl. ..................................................... 358/28
[58] Field of Search .................... 358/21, 27, 28, 40, 358/23, 35, 12, 13; 375/80-82

[56] References Cited

U.S. PATENT DOCUMENTS

| | | | |
|---|---|---|---|
| 3,946,432 | 3/1976 | Goldberg et al. | 358/13 |
| 4,020,500 | 4/1977 | Harwood | 358/19 |
| 4,051,519 | 9/1977 | Harwood | 358/21 R |
| 4,122,487 | 10/1978 | Beaulier | 358/13 |
| 4,270,139 | 5/1981 | Flamm et al. | 358/23 |
| 4,270,177 | 5/1981 | Endoh et al. | 364/571 |

FOREIGN PATENT DOCUMENTS

| | | |
|---|---|---|
| 1527453 | 10/1978 | United Kingdom . |
| 1540183 | 2/1979 | United Kingdom . |
| 1575863 | 10/1980 | United Kingdom . |
| 2050746A | 1/1981 | United Kingdom . |

OTHER PUBLICATIONS

*Color Television Fundamentals*–Milton S. Kiver, Second Edition, McGraw-Hill Book Co., 1964, p. 298.
Article "Digital VLSI Breeds Next-Generation TV Receivers" by T. Fischer, Pub. Aug. 11, 1981 Electronics, pp. 97–103.
Devereux et al., Proc. IEE, vol. 125, No. 6, pp. 591-598, Jun. 1978.

*Primary Examiner*—Robert L. Richardson
*Attorney, Agent, or Firm*—E. M. Whitacre; P. J. Rasmussen; W. B. Yorks

[57] ABSTRACT

An arrangement is provided for developing timed clock signals for a digital baseband television signal processing system. An AFPC loop circuit is responsive to the color burst signal component of a received analog video signal for producing a continuous wave signal which is aligned in frequency and phase with the color burst signal. The continuous wave signal is applied to a tint control circuit, which is responsive to a control signal, for variably shifting the phase of the continuous wave signal. The phase-shifted continuous wave signal is then applied to a phase-locked loop circuit, which produces a sampling signal for an analog-to-digital converter at a frequency which is a multiple of the color subcarrier frequency and with a phase which will result in a reproduced image of a desired tint or hue. In one embodiment of the present invention, the continuous wave signal is phase-shifted by a series of logic gates having a plurality of output taps. A multiplexer selects a signal of a desired phase shift from one of the output taps, which signal is then applied to the phase-locked loop circuit for generation of the sampling signal.

13 Claims, 7 Drawing Figures

CLOCK GENERATOR FOR A DIGITAL COLOR TELEVISION SIGNAL RECEIVER

This invention relates to television receivers in which the detected video signal is processed by digital circuitry and, in particular, to such receivers which include means for controlling the tint, or hue, of the reproduced television image.

In television receivers in which the baseband video signal is processed digitally, various clock signals are required for shifting the digital video information signals through the processor. For instance, clock signals are generally required for the analog-to-digital converter, the luminance-chrominance separation circuit, the luminance signal processor, and the color signal demodulator, as well as various additional registers within the system. It is an object of the present invention to provide a clock signal generator which is capable of providing the necessary clock signals for a baseband digital television signal processing system.

It is desirable to make a digital television signal processing system responsive to a number of user controls. The functions for which user controls are generally provided in a television receiver include contrast in the luminance signal processing channel, and color saturation and color hue or tint in the chrominance signal processing channel. In a conventional television receiver using analog processing circuitry, the tint of the reproduced image is usually controlled by controlling the phase of the color reference signal applied to the chroma demodulators from an automatic frequency and phase control (AFPC) loop circuit. It is a further object of the present invention to provide a tint control circuit in the clock signal generator of a digital television signal processing system.

In accordance with the principles of the present invention, an arrangement is provided for developing timed clock signals for a digital baseband television signal processig system. An AFPC loop circuit is responsive to the color burst signal component of a received analog video signal for producing a continuous wave signal which is locked in frequency and phase withe the color burst signal. The continuous wave signal is applied to a tint control circuit, which is responsive to a control signal, for variably shifting the phase of the continuous wave signal. The phase-shifted continuous wave signal is then applied to a phase-locked loop circuit, which produces a sampling signal for an analog-to-digital converter at a frequency which is a multiple of the color subcarrier frequency and with a phase which will result in a reproduced image of a desired tint or hue.

The sampling signal may be applied to logic circuitry for the generation of clock signals having predetermined phase relationships with the sampling signal for a digital color demodulator.

In a first embodiment of the present invention, an analog circuit is provided for tint control. In a second embodiment of the present invention, the continuous wave signal is phase-shifted by a series of logic gates having a plurality of output taps. A multiplexer selects a signal of a desired phase shift from one of the output taps, which signal is then applied to the phase-locked loop circuit for generation of the sampling signal.

Figures 1, 6:
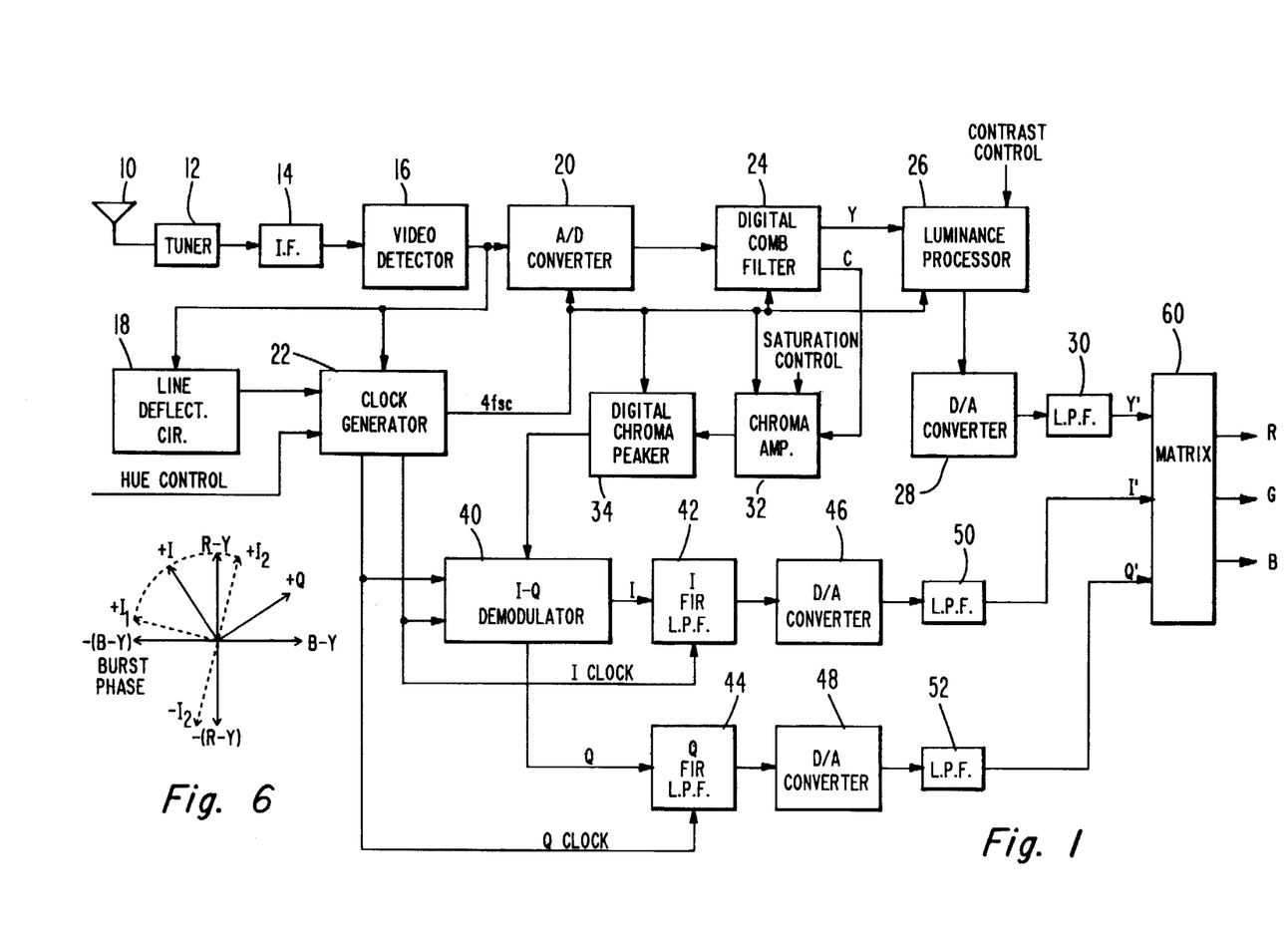
FIG. 1 illustrates, in block diagram form, a digital television processing arrangement including a clock signal generator constructed in accordance with the principles of the present invention.
FIG. 6 is a phasor diagram used to explain the operation of the arrangements of FIGS. 2 and 3.

In FIG. 1, a television signal is received by an antenna 10 and subsequently processed by a tuner 12, intermediate frequency circuits 14, and a video detector 16, which are constructed in a conventional manner. The detected video signal at the output of the detector 16 is applied to the input of an analog to digital (A/D) converter 20. The A/D converter 20 samples the video signal at a rate equal to four times the color subcarrier frequency ($4f_{sc}$), and produces digital samples of the video signal at this rate. Each digital sample, or word, may comprise, for example, eight bits produced in parallel. In an eight-bit system, the analog video signal will be quantized to one of two-hundred and fifty-six discrete levels. The $4f_{sc}$ sampling clock for the A/D converter 20 is developed by a clock signal generator 22, which produces the sampling signal nominally in phase and frequency lock with the color burst signal of the analog video signal provided by the video detector 16.

The video signal at the output of the detector 16 is also applied to line deflection circuits 18, which separate the horizontal synchronizing signal components from the video signal. The line deflection circuits 18 develop keying pulses of relatively short duration (e.g., the line blanking interval) at the horizontal line rate, which are applied to the clock signal generator 22 as burst gating pulses. The clock signal generator 22 also receives a user-controlled hue control signal which determines the hue of the reproduced color image. The $4f_{sc}$ sampling clock signal is also used as a clocking signal for a digital comb filter 24, a luminance processor 26, a chroma amplifier 32, and a digital chroma peaker 34.

The digitized video signal produced by the A/D converter 20 is applied to an input of a digital comb filter 24. Such a comb filter is described in the article "Digital Television Image Enhancement", by John P. Rossi, volume 84 of the Journal of the SMPTE at 545-51 (1974). The comb filter 24 produces a separated luminance signal, Y, which is applied to a luminance signal processor 26. The luminance processor 26 is responsive to a viewer controlled contrast control signal and produces a processed luminance signal, which is applied to the inputs of a digital-to-analog (D/A) converter 28. The luminance signal, now in analog form, is filtered by a lowpass filter 30 to remove sampling frequency components, and a processed luminance signal Y' is applied to one input of a matrix arrangement 60.

The comb filter 24 also produces a separated chrominance signal C, which is applied to the input of a chroma amplifier 32. The chroma amplifier 32 amplifies the chrominance signal in response to a viewer controlled color saturation control signal, and applies the amplified chrominance signal to the input of a digital chroma peaker 34. The chroma peaker 34 is a digital filter which modifies the response characteristic exhibited by the chrominance signal at this point to compensate for the response characteristic of the intermediate frequency circuits 14. The intermediate frequency circuits generally locate the color subcarrier frequency on the lower frequency slope of the I.F. passband, causing the color sidebands to exhibit a rolloff of 6 dB per octave. The chroma peaker 34 compensates for this rolloff to cause the chrominance signal to exhibit an essentially flat amplitude versus frequency response. If the I.F. circuits 14 are designed to provide an essentially flat amplitude versus frequency response for color signals, the chroma peaker 34 may be replaced by a chroma bandpass filter with a response characteristic located about the color subcarrier frequency.

The peaked or bandpassed chrominance signals are then applied to an input of an I-Q demodulator 40. The I-Q demodulator is responsive to I and Q clock signals from the clock signal generator 22, and demodulates the chrominance signal into its baseband I and Q color mixture signal components. The demodulated I signal is applied to an input of an I finite impulse response (FIR) filter 42, and the demodulated Q signal is applied to an input of a Q FIR filter 44. The I filter has a passband extending from zero to approximately 1.5 MHz, and the Q filter has a passband extending from zero to 0.5 MHz. The I and Q filters remove high frequency noise contained in the color signals by reason of the broad bandwidth of the preceding processing circuitry.

The filtered I and Q signals are converted to analog signals by D/A converters 46 and 48, respectively, and the analog signals are then filtered by lowpass filters 50 and 52 to remove sampling frequency components. The resultant I' and Q' signals are applied to the matrix arrangement 60, where they are matrixed with the Y' signal to produce R, G and B output signals. The matrix arrangement may comprise, for example, a resistive signal combining matrix.

Figure 2:
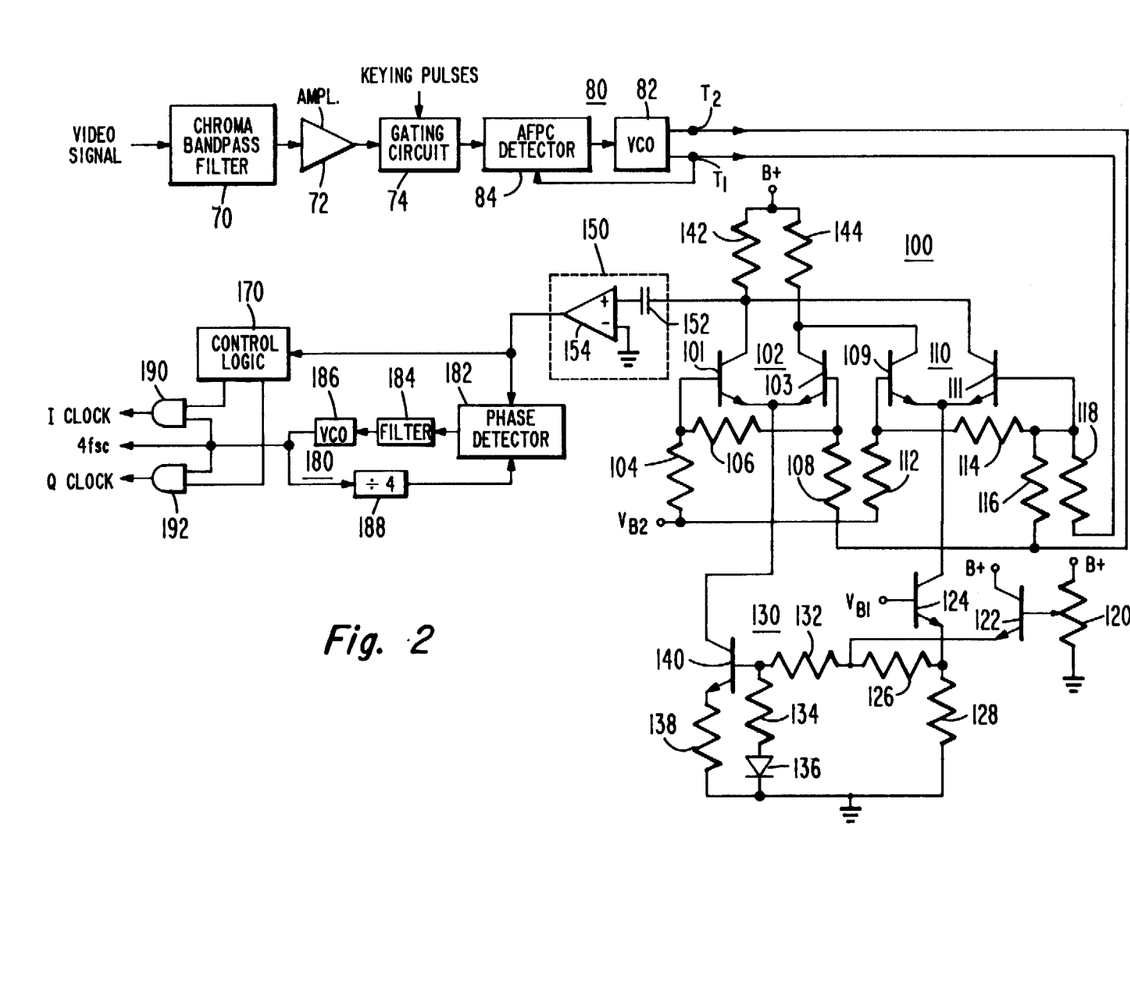
FIG. 2 illustrates, partially in block diagram form and partially in schematic diagram form, a clock signal generator arrangement including a tint control circuit constructed in accordance with the principles of the present invention.

An embodiment of a clock signal generator 22 of FIG. 1, constructed in accordance with the principles of the present invention, is shown in FIG. 2. The video signal from the detector 16 of FIG. 1 is applied to a chroma bandpass filter, which passes signals in the vicinity of the color subcarrier frequency (e.g., 3.58 MHz in the NTSC system). These signals include the color burst signal component, and are applied to the input of a gating circuit 74 by way of an amplifier 72. The gating circuit 74 is responsive to keying pulses from the line deflection circuits 18 of FIG. 1 for passing the color burst signal components to an AFPC detector 84.

The AFPC detector 84 is also supplied with a color reference signal from a first (quadrature) output terminal $T_1$ of a voltage controlled oscillator (VCO) 82. The AFPC detector 84 provides control signals to a control input of VCO 82 to maintain continuous wave reference signals at VCO output terminals $T_1$ and $T_2$ in phase and frequency lock with the received color burst signal. A suitable detector which may be used as AFPC detector 84 is described in U.S. Pat. No. 3,740,456, and a VCO useful as VCO 82 is described in U.S. Pat. No. 4,020,500.

The signals produced by VCO 82 are applied to a tint control circuit 100, which includes first and second differential amplifiers 102 and 110, and a gain control circuit 130.

Amplifier 102 includes emitter coupled transistors 101 and 103, a load resistor 144 coupled from a collector of transistor 103 to an operating supply voltage (B+) and a load resistor 142 coupled from a collector of transistor 101 to the B+ supply voltage. A bias supply voltage ($V_{b2}$) is coupled via a resistor 104 to the base of transistor 101 and via an additional isolation resistor 106 to the base of transistor 103. The second output terminal $T_2$ of VCO 82 is coupled to the base of transistor 103 via a resistor 108 to supply continuous wave color reference subcarrier information (e.g., 3.58 MHz).

Amplifier 110 includes emitter coupled transistors 109 and 111. A collector of transistor 109 is connected to the collector of transistor 103 and to load resistor 144. A collector of transistor 111 is connected to the collector of transistor 101 and to load resistor 142 to form a combined signal output of tint control circuit 100. The bias supply $V_{b2}$ is coupled via a resistor 112 to the base of transistor 109 and via an additional resistor 114 to the base of transistor 111. The output terminal $T_2$ of VCO 82 is coupled via a resistor 116 to the base of transistor 111, while output terminal $T_1$ of VCO 82 is coupled via a resistor 118 to the base of that same transistor 111.

Control circuit 130 includes transistors 140 and 124 arranged in a differential input configuration, and a bias control transistor 122. A collector of transistor 140 is connected to the joined emitters of transistors 101 and 103 of amplifier 102, and the emitter of transistor 140 is returned to ground by a bias resistor 138. A series combination of a bias resistor 134 and a temperature compensation diode 136 is coupled between a base of transistor 140 and ground. A collector of transistor 124 is connected to the joined emitters of transistors 109 and 111 of amplifier 110, while the emitter transistor 124 is returned to ground by a bias resistor 128. The base of transistor 124 is coupled to a second bias supply voltage ($V_{b1}$). A pair of series connected bias resistors 132 and 126 is coupled between the emitter of transistor 124 and the base of transistor 140. The point of interconnection of resistors 132 and 126 is connected to an emitter of bias control transistor 122. Transistor 122, which is arranged in an emitter follower configuration, includes a collector connected to the B+ supply and a base coupled to a wiper arm of a tint control potentiometer 120.

The VCO 82 provides a first oscillatory reference signal $-(R-Y)$ (e.g., at 3.58 MHz) of a first phase at output terminal $T_1$, and a second oscillatory signal $-(B-Y)$ which is in logging quadrature phase relation with signal $-(R-Y)$ at output terminal $T_2$. These signals are shown in the phase diagram of FIG. 6. For proper demodulation of the received chrominance signal, the first oscillatory reference signal may exhibit either a leading $[-(R-Y)$ phase] or lagging $[(R-Y)$ phase] quadrature relationship with respect to the received burst signal.

Resistor 108, which forms a voltage divider with resistors 106 and 104, couples an in-phase fraction of the signal at terminal $T_2$ $[-(B-Y)]$ to the base of transistor 103. Amplified antiphase $(B-Y)$ and in-phase $-(B-Y)$ reference signals are produced at the outputs of transistors 103 and 101, respectively. Resistor 118, which forms a voltage divider with resistors 112 and 114, couples an in-phase fraction of the signal at terminal $T_1$ $(-(R-Y))$ to the base of transistor 111.

The signal at terminal $T_2$ is also applied via resistor 116, which forms a voltage divider with resistors 114 and 112, to produce an in-phase fraction of the signal at terminal $T_2$ at the base of transistor 111. The magnitude of the signal provided by resistor 116 is selected according to the range of phase control to be provided by tint control circuit 100.

The signal provided by resistor 116 is summed with the signal provided by resistor 118 at the base of transistor 111 to form a combined signal which is hereafter designated as signal $-(I_2)$, having a resultant phase intermediate the VCO signals. Combined signal $-(I_2)$ is reproduced in amplified antiphase $(+I_2)$ and in-phase $(-I_2)$ form at the collector outputs of transistors 111 and 109, respectively. The output signal developed across load resistor 144 at the joined collectors of transistors 103 and 109 therefore corresponds to $(B-Y)-I_2$, and the signal developed across load resistor 142 at the joined collectors of transistors 101 and 111 corresponds to $-(B-Y)+I_2$. These two signals are of opposite phase.

The magnitudes of the individual signal components developed across load resistors 144 and 142 may be controlled by varying the conduction level or voltage gain of amplifiers 102 and 110. The gains of amplifiers 102 and 110 are differentially controlled by the current supply transistors 140 and 124 of control circuit 130. Transistors 140 and 124 in turn are controlled as a function of the control voltage applied from tint control potentiometer 120 to the base of transistor 140 and the emitter of transistor 124 via follower transistor 122 and bias resistors 132 and 126. The values of resistors 132 and 126 are selected to provide a desired degree of control over the relative conduction of transistors 140 and 124.

For example, when the wiper arm of potentiometer 120 is adjusted to the extreme position toward the B+ supply voltage, transistor 124 and therefore amplifier 110 are rendered substantially nonconductive, while transistor 140 and amplifier 102 reach maximum conduction. At this control position, only in-phase and antiphase components of signal $-(B-Y)$ are respectively developed across load resistors 142 and 144. Conversely, the conduction level of transistor 124 and amplifier 110 reach a maximum when potentiometer 120 is adjusted to the other extreme toward ground. In that case, transistor 140 and amplifier 102 are substantially cut-off so that only in-phase and antiphase components of signal $-(I_2)$ are respectively developed across load resistors 144 and 142. When potentiometer 120 is adjusted so that transistors 140, 124 and associated amplifiers 102, 110 conduct equally, signals $-(B-Y)$ and $-I_2$ of equal magnitude are developed across output load resistors 144 and 142. For this condition a combined output signal $(B-Y)-I_2$ is developed across resistor 144, and a combined opposite phase output signal $-(B-Y)+I_2$ is developed across resistor 142.

In FIG. 6, a signal $+I$ is illustrated which corresponds to the flesh-tone phase of received image-representative chrominance signals. Under normal operating conditions, the $+I$ signal forms a lagging phase angle of about fifty-seven degrees with the burst signal at the $-(B-Y)$ phase. The tint control stage 100 provides compensation for positive or negative phase variations by providing for symmetrical variation of the phase of a color reference signal output about the $+I$ signal axis over a predetermined operating range between the phases of the signals $-(B-Y)$ and $+I_2$. Resistors 112, 114 and 116 are chosen to make this control range symmetrical about the "I" phase. That is, the $+I$ signal is derived by combining the $-(B-Y)$ and $I_2$ signals in load resistor 142 to produce a combined signal $+I$ at the joined collectors of transistors 101 and 111. When potentiometer 120 is adjusted so that amplifiers 102 and 110 conduct equally, equal amounts of the $-(B-Y)$ and $I_2$ signals are combined in output load resistor 142. The $+I$ signal therefore forms a lagging phase angle of about fifty-seven degrees with the burst signal for the normal signal condition, and also forms a leading phase angle equal to fifty-seven degrees with signal $I_2$. The construction and operation of tint control circuit 100 is described in greater detail in U.S. Pat. No. 4,051,519.

The reference signal at the collector of transistor 101, as adjusted for tint control, is applied to a squaring circuit 150, which includes a capacitor 152 and a comparator 154. The capacitor A.C couples the reference signal to one input of the comparator 154 so that the reference signal swing is about a reference voltage level (ground). Since the second input of the comparator is coupled to ground, the comparator will produce a square-wave replica of the reference signal.

The output of the squaring circuit 150 is coupled to the input of control logic 170 and to the input of a phase detector 182 of a phase-locked loop 180. The phase-locked loop 180 additionally includes a filter 184, a voltage-controlled oscillator (VCO) 186, and a divider 188 which divides the frequency of the VCO output signal by four. The voltage-controlled VCO oscillator 186 will thus produce a sampling signal at a frequency of four times the reference signal frequency ($4f_{sc}$) which is locked in phase with the phase of the reference signal applied to the phase detector 182. In the NTSC system, the reference signal has a frequency of 3.58 MHz, and the sampling signal $4f_{sc}$ has a frequency of 14.32 MHz. The sampling signal $4f_{sc}$ is applied to the A/D converter 20 as shown in FIG. 1, and is also applied to inputs of AND gates 190 and 192 as shown in FIG. 2. Outputs from the control logic 170 are also coupled to inputs of AND gates 190 and 192 to gate selected ones of the sampling signal pulses to the I and Q FIR filters 42 and 44.

Figure 3:
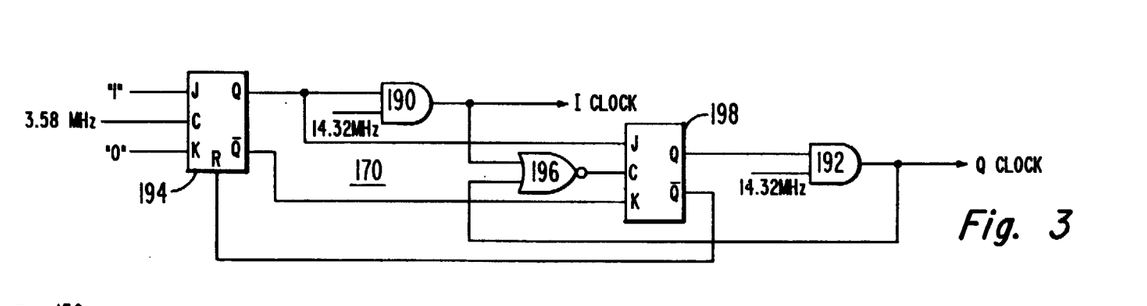
FIG. 3 illustrates in schematic diagram form the control logic circuitry of FIG. 2 which may be used to develop clock signals for the color signal demodulator of FIG. 1.

Control logic 170 is shown in greater detail in FIG. 3. The reference signal at the output of squaring circuit 150 is applied to the C (clock) input of a JK flip-flop 194. The J input of flip-flop 194 is coupled to a logical "1" voltage level, and the K input is coupled to a logical "0" voltage level. The Q output of flip-flop 194 is coupled to an input of AND gate 190, and to the J input of a second JK flip-flop 198. The Q output of flip-flop 194 is coupled to the K input of flip-flop 198.

The output of AND gate 190 is coupled to an input of a NOR gate 196, the output of which is coupled to the C input of JK flip-flop 198. The $\overline{Q}$ output of flip-flop 198 is coupled to an input of AND gate 192, and the Q output of JK flip-flop 198 is coupled to the R (reset) input of flip-flop 194. The output of AND gate 192 is coupled to a second input of NOR gate 196.

In operation, the AFPC loop 80 produces a 3.58 MHz continuous wave signal locked in phase with the color burst signal. The tint control circuit 100 produces a phase-shifted replica of this signal, which has a phase between phases $+I_1$ and $+I_2$ as shown in FIG. 6, and a nominal phase aligned with the $+I$ axis at a mid-point setting of tint control potentiometer 120. The phase-shifted reference signal at the output of the tint control circuit 100 is squared, and used by the phase-locked loop 180 to produce a sampling signal $4f_{sc}$ for the A/D converter 20 of FIG. 1. The hue, or tint, of the reproduced video image is thereby determined by the clock generator 22 and the A/D converter 20, which operate to sample the video signal at phases of the burst signal determined by the setting of the tint control potentiometer 120. Thus, whereas tint is determined through control of the chrominance demodulators in the typical analog signal processing receiver, the arrangement according to the present invention determines picture tint by controlling the phase of the sampling signal for the A/D converter in a digital television receiver.

Figure 4:
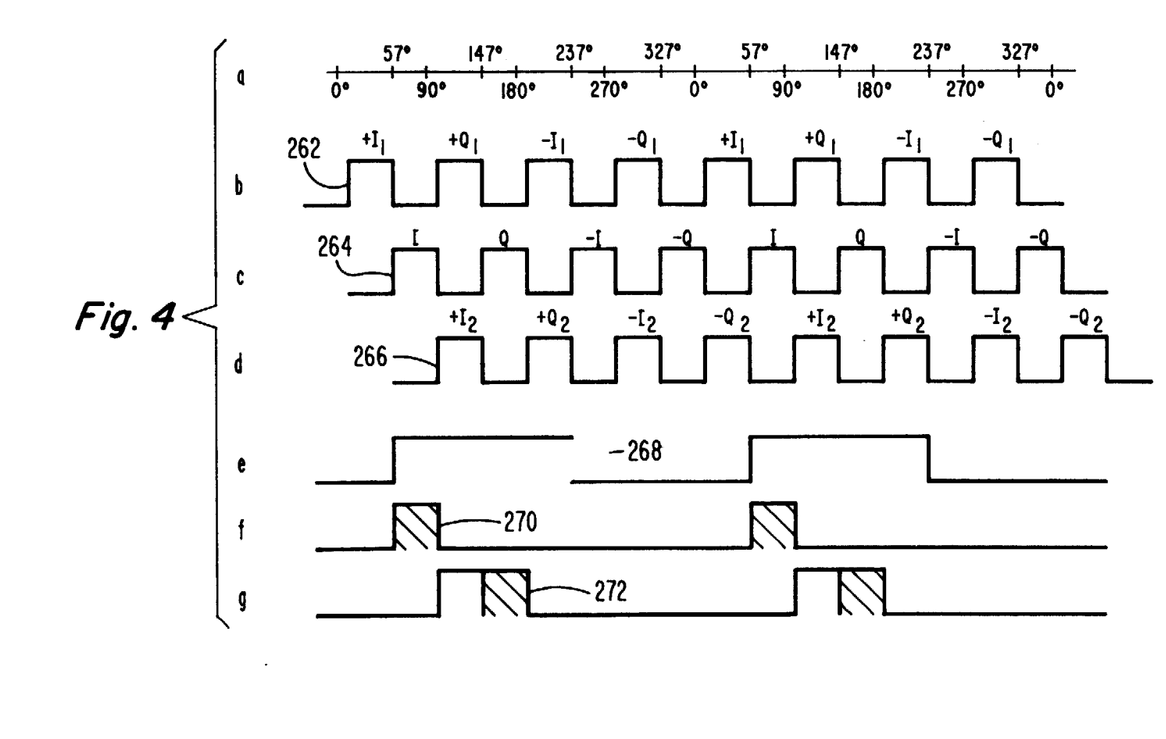
FIG. 4 shows waveforms used to explain the operation of the arrangement of FIGS. 2 and 3.

At the nominal mid-point setting of potentiometer 120, the $4f_{sc}$ sampling signal will cause the A/D converter 20 to sample the video signal along the I and Q axes, with the $4f_{sc}$ sampling signal having a phase relationship with respect to the 3.58 MHz continuous wave signal as shown by the sampling signal waveform 264 of FIG. 4c. Sampling signal 264 will sample the video signal at 57° (I), 147° (Q), 237° (−I) and 327° (−Q) with respect to the burst phase shown in FIG. 4A. As the potentiometer 120 is varied to shift the phase of the continuous wave reference signal between the $+I_1$ and $+I_2$ positions over the range shown in FIG. 6, the $4f_{sc}$ sampling signal waveforms 262 and 266 shown in FIGS. 4b and 4d are produced at the extreme positions, respectively.

When the potentiometer 120 is at its nominal mid-point setting, the squaring circuit 150 produces a reference waveform 268, as shown in FIG. 4e. The phase-locked loop 180 will then produce $4f_{sc}$ sampling signals 264 as shown in FIG. 4c. Reference waveform 268 is applied to flip-flop 194 in FIG. 3, causing that flip-flop to set at a positive-going transition of waveform 268. The Q output of flip-flop 194 enables AND gate 190, which produces an I clock pulse 270 at its output, as shown in FIG. 4f. Upon termination of the I clock pulse 270, the output of NOR gate 196 produces a positive-going signal transition, which sets JK flip-flop 198. The $\overline{Q}$ output of flip-flop 198 goes low, resetting JK flip-flop 194 and disabling AND gate 190. The Q output of flip-flop 198 now enables AND gate 192, which passes a Q clock pulse during the shaded portion of pulse 272 of FIG. 4g. At the termination of the Q clock pulse, flip-flop 198 is again clocked by NOR gate 196, which resets flip-flop 198. AND gate 192 is thereby disabled, and the $\overline{Q}$ output of flip-flop 198 goes high to enable flip-flop 194 to be set by the next positive-going transition of waveform 268. The I and Q clock pulses are used by the I-Q demodulator 40 and I and Q FIR filters 42 and 44 to demodulate and filter the baseband color signals, as described in detail in concurrently filed U.S. patent application Ser. No. 297,556 entitled "DIGITAL COLOR TELEVISION SIGNAL DEMODULATOR", the contents of which are hereby incorporated by reference.

Figures 5A, 5B:
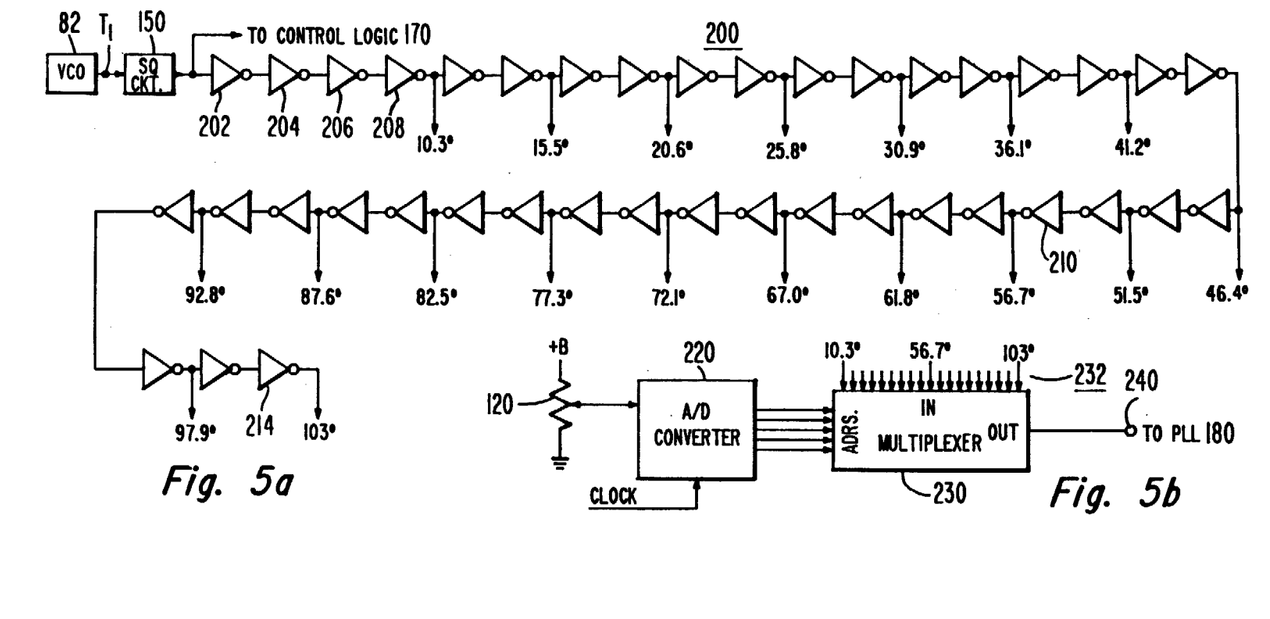
FIGS. 5a and 5b show digital circuitry used in conjunction with a portion of the embodiment of FIG. 2 to provide tint control.

The tint control circuit 100 of FIG. 2 may be realized in a digital form as shown in FIGS. 5a and 5b. In FIG. 5a, the $T_1$ output of VCO 82, which produces a lagging [(R−Y) phase] reference signal locked in phase with the color burst signal, is coupled to the input of squaring circuit 150. The output of the squaring circuit is coupled to control logic 170, and to the input of an inverter 202. Inverter 202 is coupled in series with thirty-nine other similar inverters in this example, including inverters 204, 206, 208; a central inverter 210, and a final inverter 214. The outputs of nineteen of the inverters in the string 200 are coupled to signal inputs shown at 232 of a multiplexer 230, shown in FIG. 5b. The wiper arm of tint control potentiometer 120 in FIG. 5b is coupled to an input of an A/D converter 220, which is clocked by a clock signal. The outputs of A/D converter 220 are coupled to address inputs of the multiplexer 230. The output of the multiplexer 230 is coupled to an output terminal 240, which supplies a phase-shifted reference signal for phase-locked loop 180 in FIG. 2.

In operation, the inverter string 200 in FIG. 5a progressively delays the 3.58 MHz reference signal as it passes through the inverters. Output signals from the inverter string 200 represent different discrete phases of the reference signal, and an appropriate one is connected to output terminal 240 in accordance with the multiplexer address determined by the converted setting of tint control potentiometer 120.

For example, assume that each inverter of the string 200 has a two nanosecond propagation time. Each inverter will therefore shift the phase of the reference signal by 2.5773195 degrees. Thus, at the output of inverter 208, the reference signal at the output of the squaring circuit 150 will be cumulatively delayed by 10.3 degrees. This approximates the phase of the $+I_1$ phasor of FIG. 6, at one end of the desired range of tint control. The output of inverter 208 will be multiplexed to output terminal 240 when potentiometer 120 is set at one extreme of its range of control.

Similarly, the reference signal is phase-shifted by 103 degrees when it reaches the output of the last inverter 214, which approximates the $+I_2$ extreme of the tint control range. When potentiometer 120 is set to the other extreme of its control range, the output of inverter 214 will be multiplexed to the output terminal 240.

When tint control potentiometer 120 is at its nominal mid-range setting, the output of inverter 210 will be multiplexed to output terminal 240. At the output of inverter 210, the reference signal has been phase-shifted by 56.7 degrees in this example, which approximates the $+I$ axis phase in FIG. 6. At this setting, the video signal will be sampled along the I and Q axes for the reproduction of a color television image with substantially no tint adjustment.

The preceding examples assume that the reference signal is at a 90° phase with respect to the color burst signal at the output of the squaring circuit 150, and that the multiplexer imparts no delay to the multiplexed signal. In practice, however, the reference signal will be phase-referenced at the output of the VCO 82, and the multiplexer 230 in FIG. 5b will impart some propagation delay to the multiplexed signal. Thus, it is the total propagation delay between terminals $T_2$ and 240 which should be considered. Accordingly, the propagation delays of the squaring circuit 150 and the multiplexer 230 may be compensated quite easily be selection of the proper number of inverters 202-208 at the input of the inverter string 200. For instance, if the multiplexer has a propagation time equal to that of two inverters, two of inverters 202-208 can be deleted from the string to compensate for this propagation time. Similarly, inverters can be deleted to compensate for the propagation time of the squaring circuit 150, if necessary.

The nineteen selected outputs of the inverter string provide discrete phase shifts in increments of 5.15 degrees over a range of approximately ±45° with respect to the I axis at 57°. These increments were chosen because the minimal tint shift visible to the eye is approximately 5° to 6°. If finer increments or a greater range of tint control is desired, inverters with shorter propagation times can be employed, or more inverters can be added to the string as desired.

Since the A/D converter 220 is responsive to the user-controlled potentiometer 120, it may be of a low-speed variety, such as a successive approximation A/D converter. Accordingly, the clock signal for A/D converter may be a low-frequency clock chosen from any of a variety of clock signals in the system.

The embodiment of FIG. 5a is designed for demodulation about the I and Q color mixture signal axes, but can easily be modified for demodulation about the (R-Y) and (B-Y) color difference signal axes by increasing the number of inverters at the input of the string 200 from four (i.e., 202-208) to eighteen. Tint control can then be effected over a range of ±45° with respect to the (R-Y) and (B-Y) axes.

What is claimed is:

1. In a television receiver, including a source of analog video signals containing chrominance signal components and a color burst signal component; and digital video signal processing circuitry having an input for receiving digitized video signals and an output at which processed video signals are produced; apparatus comprising:
    an analog-to-digital converter having a signal input coupled to receive said analog video signals, an output coupled to the input of said digital video signal processing circuitry, and a sampling signal input;
    a sampling signal generating circuit having an input coupled to receive said analog video signals and an output coupled to said sampling signal input of said analog-to-digital converter for applying a sampling signal thereto having a frequency which is a multiple of the frequency of said color burst signal component, said sampling signal generating circuit including
    means, responsive to said color burst signal component, for generating said sampling signal in predetermined phase relationship with said color burst signal component and at said frequency which is a multiple of the frequency of said color burst signal component; and
    a tint control circuit, coupled to said sampling signal generating means for varying said predetermined phase relationship in response to a user control for controllably shifting the phase of said sampling signal with respect to that of said color burst component, said tint control circuit including
    means, including an adjustable impedance element as said user control, for producing a control signal which is continuously variable over a given range as said impedance element is adjusted, and
    a second analog-to-digital converter responsive to said variable control signal for generating digital control signals representing the magnitude of said variable control signal, wherein
    said means for generating said sampling signal includes
    means for developing a plurality of successively delayed sampling signals, and
    multiplexer means having a plurality of inputs to which ones of said successively delayed sampling signals are respectively applied, an output, and a plurality of address inputs to which said digital control signals produced by said second analog-to-digital converter are applied for selectively coupling one of said successively delayed sampling signals to the output of said multiplexer means as said sampling signal according to the magnitude of said variable control signal,
    whereby tint information as represented by said processed video signals differs from that represented by said analog video signals according to adjustment of said user control.

2. The arrangement of claim 1, wherein said tint control circuit comprises delay means having an input responsive to said sampling signal and a plurality of outputs for producing phase-shifted replicas of said sampling signal at said outputs; and
    means, responsive to said user control, for coupling one of said outputs of said delay means to said output of said sampling signal generating circuit.

3. The apparatus recited in claim 1 wherein
    said means for developing includes:
    means for generating a reference signal having a predetermined phase relationship to said color burst signal component;
    delay means having a plurality of stages for successively delaying said reference signal; and
    a plurality of taps coupled to said stages at which successively delayed reference signals are developed as said successively delayed sampling signals.

4. The apparatus recited in claim 3 wherein said delay means includes a plurality of amplifier stages.

5. The apparatus recited in claim 4 wherein said amplifier stages are inverting amplifiers.

6. In a television receiver, including a source of analog video signals including a color burst signal component, an analog-to-digital converter responsive to a sampling signal and having an input coupled to receive said analog video signals and an output at which digitized video signals are produced; and digital video signal processing means having an input coupled to the output of said analog-to-digital converter for processing said digital video signals, a timing pulse generating circuit comprising:
    means, coupled to receive said analog video signals including said color burst signal component, for producing a reference signal in phase lock with said color burst signal;
    a tint control circuit, responsive to a user-adjusted control, and having an input coupled to receive said reference signal and an output at which a controllably phase-shifted reference signal is produced, said tint control circuit including
    means, including an adjustable impedance element as said user-adjusted control, for producing a control signal which is continuously variable over a given range as said impedance element is adjusted,
    a second analog-to-digital converter responsive to said variable control signal for generating digital control signals representing the magnitude of said variable control signal,
    means to which said reference signal is coupled for developing a plurality of successively delayed reference signals, and
    multiplexer means having a plurality of inputs to which said successively delayed sampling signals are applied, an output, and a plurality of address inputs to which said digital control signals produced by said second analog-to-digital converter are applied for selectively coupling one of said successively delayed reference signals to the output of said multiplexer means as said phase-shifted reference signal according to the magnitude of said variable control signal;

means having an input coupled to receive said controllably phase-shifted reference signal, for producing a sampling signal in prdetermined phase relationship with said phase-shifted reference signal at a frequency which is a multiple of the frequency of said color burst signal component; and means for applying said sampling signal to said analog-to-digital converter, whereby said digitized video signals correspond to values of said analog video signals at phase points shifted in phase with respect to said color burst signal component according to said controllable phase shift produced by said tint control circuit in response to said useradjusted control.

7. The arrangement of claim 6, wherein:

said reference signal producing means comprises an automatic frequency and phase control loop circuit responsive to said color burst signal component for producing a continuous wave reference signal in phase and frequency lock with said color burst signal component; and said sampling signal producing means comprises a phase-locked loop circuit responsive to said phase-shifted reference signal for producing a sampling signal of a frequency which is an integer multiple of the of said color burst signal component.

8. The arrangement of claim 6, wherein said tint control circuit comprises a delay means having an input responsive to said reference signal and a plurality of outputs for producing a plurality of phase-shifted replicas of said reference signal at said outputs; and means, responsive to said user control, for coupling one of said outputs of said delay means to said output of said tint control circuit.

9. The apparatus recited in claim 6 wherein said means for developing includes:

delay means having a plurality of stages for successively delaying said reference signal; and a plurality of taps coupled to said stages at which said successively delayed reference signals are developed.

10. The apparatus recited in claim 9 wherein said delay means includes a plurality of amplifier stages.

11. In a television receiver, including a source of analog video signals including a color burst signal component; an analog-to-digital converter responsive to a sampling signal and having an input coupled to receive said analog video signals and an output at which digitized video signals are produced in response to said analog video signals and said sampling signal; and digital video signal processing means having an input coupled to the output of said analog-to-digital converter for processing said digitized video signals, an adjustable timing pulse generating circuit for controlling tint comprising:

a reference signal source responsive to said color burst signal component including a phase and frequency locked loop for producing first and second continuous wave reference signals in quadrature phase relationship to each other and in phase and frequency lock with said color burst signal component;

a tint control circuit, including a user-adjusted control, for controllably combining said first and second continuous wave reference signals to produce a controllably phase-shifted reference signal shifted in phase with respect to said color burst signal component according to adjustment of said user-adjusted control;

sampling means including a phase-locked loop circuit reponsive to said controllably phase-shifted reference signal for producing said sampling signal in phase lock therewith and at a frequency which is an integer multiple of the frequency of said color burst signal component; and means for applying said sampling signal to said analog-to-digital converter, whereby said digitized video signals correspond to values of said analog video signals at phase points shifted in phase with respect to said color burst signal component according to said controllable phase shift produced by said tint control circuit in response to said user-adjusted control.

12. The arrangement of claims 8 or 2, wherein said delay means comprises a plurality of series-coupled inverters, and wherein said coupling means includes a multiplexer.

13. The arrangement of claims 1 wherein said digital video signal processing circuitry includes a color mixture signal demodulator responsive to said chrominance signal components, and wherein said sampling signal generating circuit further comprises:

control logic responsive to said sampling signal for generating first and second clock signals of frequencies which are lower than the frequency of said sampling signal and in substantially constant phase relationships therewith; and means for applying said first and second clock signals to said color mixture signal demodulator for demodulating said chrominance signal components.

* * * * *